Nov. 7, 1950         E. J. PANISH         2,529,182
COMBINED REMOTE AND PROXIMAL CONTROL DEVICE
Filed April 23, 1946         4 Sheets-Sheet 1
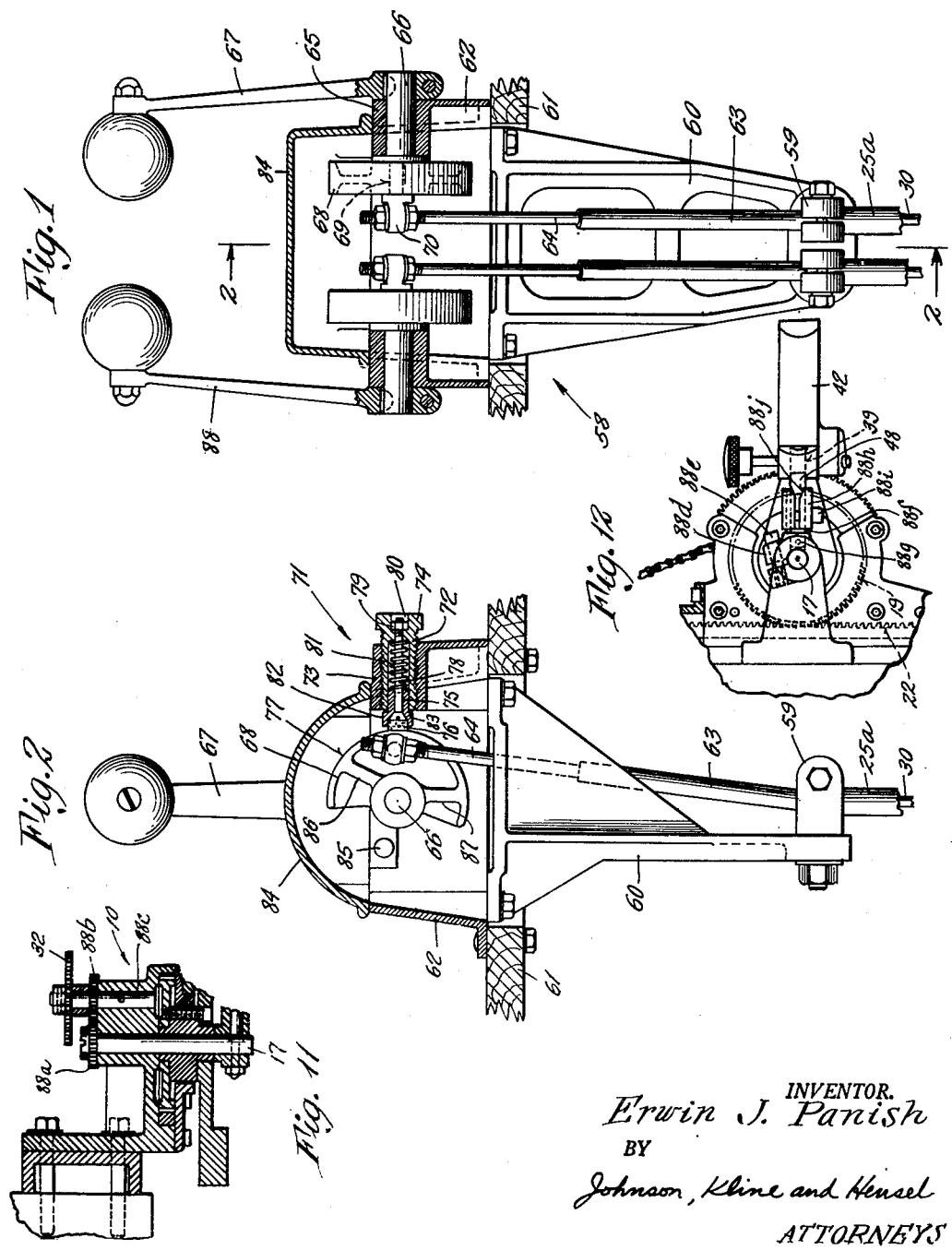
INVENTOR.
Erwin J. Panish
BY
Johnson, Kline and Hensel
ATTORNEYS

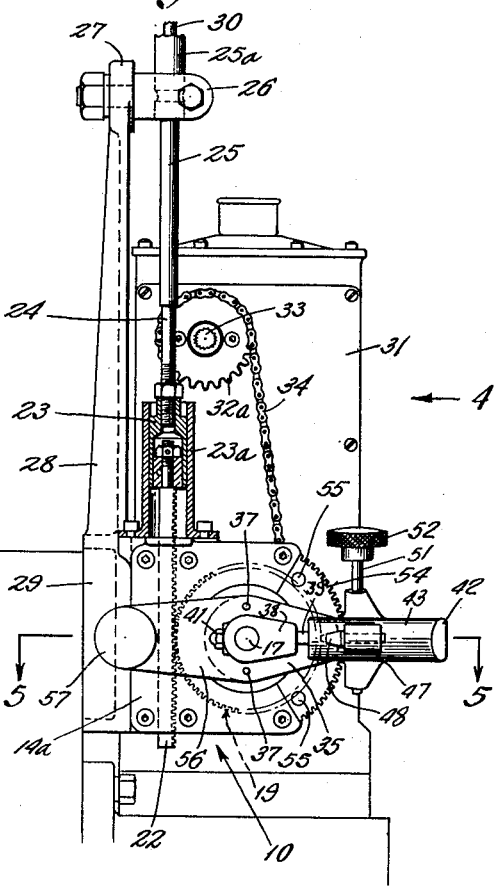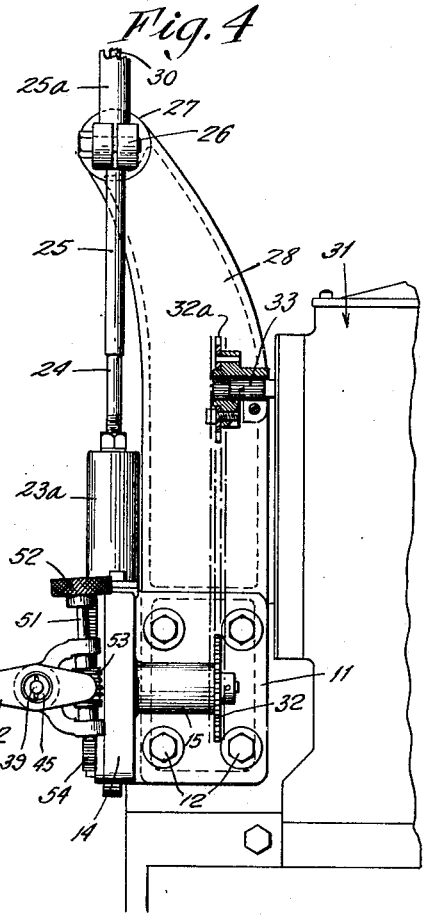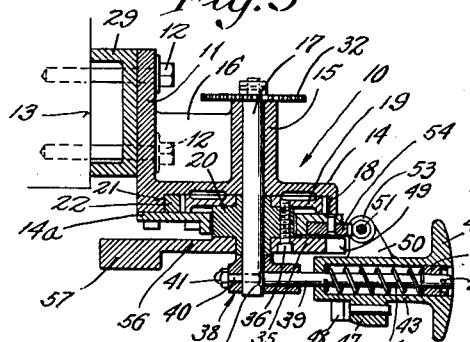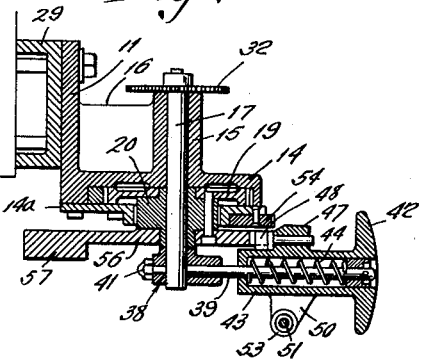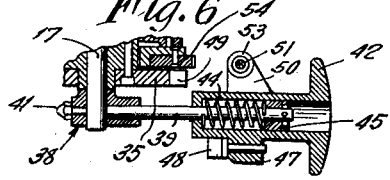

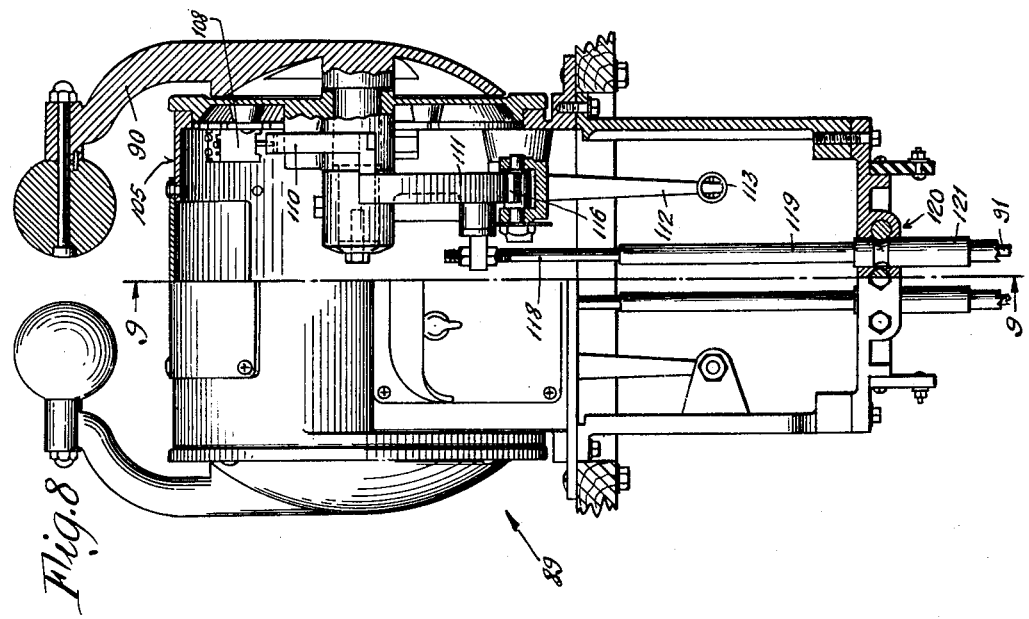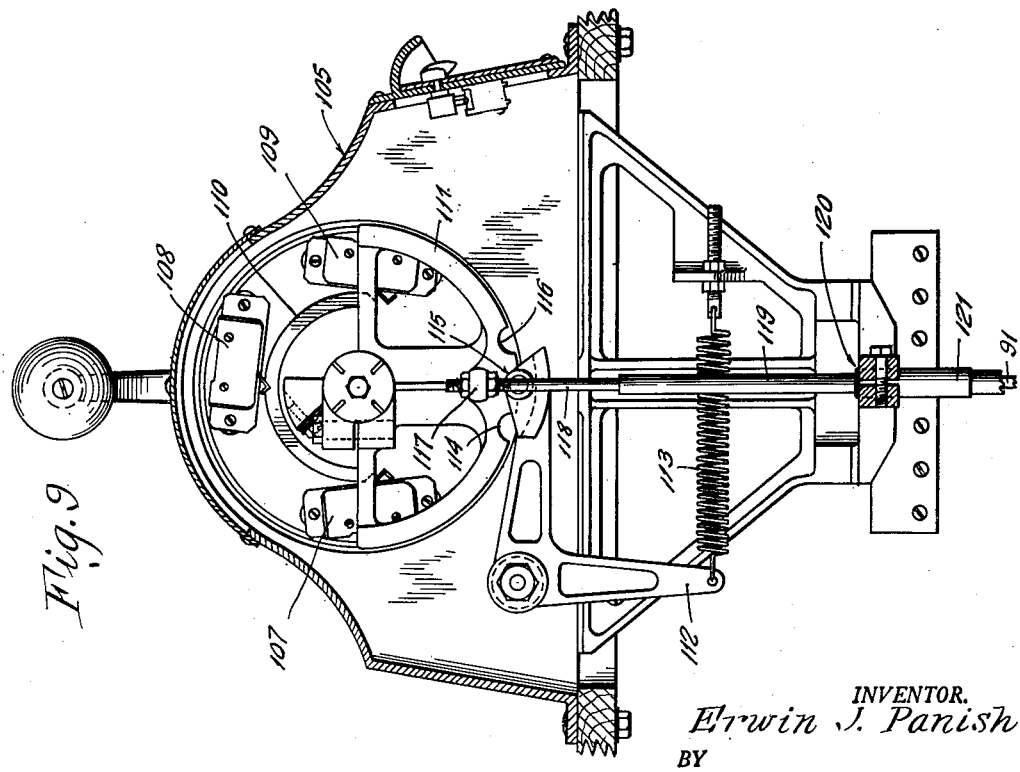

Nov. 7, 1950 E. J. PANISH 2,529,182
COMBINED REMOTE AND PROXIMAL CONTROL DEVICE
Filed April 23, 1946 4 Sheets-Sheet 4

INVENTOR.
Erwin J. Panish
BY
Johnson, Kline and Hensel
ATTORNEYS

Patented Nov. 7, 1950

2,529,182

UNITED STATES PATENT OFFICE 2,529,182

COMBINED REMOTE AND PROXIMAL CONTROL DEVICE

Erwin J. Panish, Bridgeport, Conn.

Application April 23, 1946, Serial No. 664,408

28 Claims. (Cl. 192—.096)

This invention relates to combination remote and proximal control devices for use with control means of prime movers.

The invention is illustrated and described in connection with both stationary and marine governor-controlled Diesel engines, the control device of the invention operating solely the speed regulating means of an engine, or both the speed regulating and clutch operating means of an engine. However, it should be understood that the invention is not to be limited to the specific applications shown, since it has utility in connection with other types of regulating and operating means of prime movers.

In one type of Diesel engine and governor, the latter has a manually operable speed-control member which loads the governor by operating through a mechanical reduction, so that a fine control of the governor loading and engine speed is had. In this organization a servomotor hydraulic drive is employed between the governor and engine fuel rack, the response characteristics of the drive being extremely rapid, and the arrangement being such that loading of the governor instantly effects a corresponding adjustment of the fuel rack.

An object of the present invention is to provide a simple, practical and reliable control device, utilizing positive mechanical coupling, which may be used with such a Diesel engine and governor whereby accurate finger-tip control, both remote and proximal, of the engine speed may be had. The device is so constructed that the change from proximal to remote control and vice versa is quickly and easily effected by an operator stationed at the engine, and both the remote and proximal control portions of the system are arranged to provide for quick setting, the proximal control further enabling adjustment of the speed to be made in a fine manner, with automatic locking, thereby to facilitate engine tune-up, etc.

Another object of the invention is to provide a control device with the above characteristics, in the form of an attachment which may be quickly and conveniently installed on an engine, with but a minimum of change in the existing structure.

These objects are accomplished by a novel organziation of remote push-pull drive means, motion translating mechanism, and manually operable clutch and actuating means coupled with the speed-control member of the governor, the parts of the organization except for the push-pull drive being grouped at the engine and arranged for easy mounting and coupling to the engine structure and governor.

In the specific embodiment of the invention illustrating the speed-control attachment, a base is provided for mounting on the engine structure, the base having a shaft which is conveniently connected to drive the adjustment member of the governor by sprockets and a chain. By this type of drive, the installation of the attachment is simplified, since variations in sizes and dimensions of the cooperable mounting parts may be easily taken care of by adjusting the chain length, while at the same time a positive drive is obtained. On the base a rack and gear are provided, the former being connected to the remote push-pull cable and the latter releasably connected to the said shaft through the intermediary of a manually operable clutch.

This clutch is associated with the proximal control of the attachment, and is so organized as to provide a quick and convenient means for shifting from remote to proximal control and back again, and to enable quick setting and fine adjustment of the engine speed to be effected at the engine. The clutch comprises an operating arm secured to the shaft on the base, the arm carrying a slidably mounted handle which may be shifted to different predetermined positions, one retracted position forming a driving connection to the gear. The handle carries a manually operable worm, and when placed in another retracted position which is rotatably different from the first, it causes the worm to mesh with a rack segment secured to the base, and breaks the driving connection to the gear. When the handle is in this latter position, turning of the worm provides a fine, regulatory type of adjustment of the shaft, and therefore of the engine speed. A quick adjustment of the shaft and engine speed may be had by holding the handle in a third, extended position wherein the worm is disengaged from the rack segment, and wherein the handle and arm are free to be moved quickly and through a large or small arc as desired.

When the handle is in the position where the clutch drivingly connects together the rack-controlled gear and the shaft, thereby rendering effective the remote control, the worm and rack segment are disengaged to permit free remote operation of the handle and arm.

During this latter remote-control position of the handle, a counterweight is made operable whereby the mass of the arm and of the handle is compensated for, so that vibration and shock to which the attachment might be subjected will not alter the setting of the control, and change the loading of the governor and speed of the engine.

The manually operable means at the remote control station includes a friction device which further insures against creeping of the control from any adjusted position. The friction device is operable to provide a lock, which is advantageous in stationary engine installations where a constant predetermined speed is to be maintained over a considerable interval of time.

Another object of the present invention is to provide a simple and reliable combination control device for controlling simultaneously from a remote point both the speed-control member and the reverse gear, in the prime mover of a marine craft, the said device being responsive to finger-tip pressures, and being operable to enable practically instantaneous reversing, from the said remote point, of the propeller of the craft without likelihood of stalling of the engine, and yet to enable the speed control and/or the clutch control to be taken over at the engine, if this should become necessary. Such a control is of considerable value where, for instance, a high degree of maneuverability is required to meet emergencies, and under combat and like conditions.

In accomplishing this, there is provided, under the control of a single remotely located operating member, a finger-tip type direct or positive connected speed-control mechanism and a power-operated reversing mechanism, the latter having an extremely rapid response characteristic. The organization is such that, in a marine installation, a "lightning" changeover may be made from full speed ahead to full speed astern and vice versa in an interval of approximately three-fifths of a second. During such changeover the speed-control member of the prime mover is automatically, positively and without any lag, first moved to retarded position and then again moved to advanced position, the retarded position corresponding with the changeover position of the reverse gear control. However, the response characteristic of the reverse gear control is so rapid that, in conjunction with the positive, non-lagging speed control, stalling of the engine is averted, since the latter has no time in which to slow down, and since there is no dwell of the speed control in idling or retarded-throttle position.

The remote control part of the system when operated in the normal, more deliberate manner functions to automatically throttle and therefore decelerate the prime mover when changing from full ahead or full astern to neutral position, after which deceleration the reverse gear is operated to disengage the prime mover. When changing from neutral to full ahead or full astern, the reverse gear is first operated, and then the speed-control member of the prime mover automatically actuated following the coupling of the propeller. These operations, except for the deceleration of the prime mover, occur in sequence when the control is quickly operated from full ahead through neutral to full astern or vice versa, because of the extreme rapidity with which the reversing mechanism responds. During such quick operation, the momentum of the prime mover does not permit its slowing down to any appreciable extent in the short interval that the throttle is retarded, and this is extremely advantageous since it prevents the prime mover from stalling after sudden increased load is imposed on it due to the reversing of the propeller.

That part of the system which controls the reversing mechanism includes electrically powered means, the said means operating with such radipity that there is no noticeable lag in the response of the control, regardless of the speed of manipulation of the manually operable means.

When the control is to be taken over at the engine, either in part or in full, this is accomplished in the following manner: To render inoperative the remote reverse-gear control, an electrical switch means is opened at the engine, deenergizing the electrically powered portion of the control, whereupon the reverse gear operating handle may be employed to operate the gear from the engine, as desired. To render inoperative the remote speed control, the manually operable clutch lever on the base of the speed-control attachment is actuated to disconnect the remote push-pull drive means, and to connect the clutch lever to operate the speed-control member of the governor direct. Thus, an operator stationed at the engine may take over from the remote control point the speed control and/or the clutch control, that control not taken over remaining operative from the said point.

A feature of the invention is the provision, in the present throttle control system, of simple and novel means associated with the manually operable handle and worm located at the engine, for correctly positioning the worm when the latter is operative, and for relieving the worm of any force tending to bind it and make its operation difficult. This means, in the specific embodiment illustrated, comprises a collar which is adjustable carried by the operating arm on the base of the device and is adapted to engage a clutch part carried by the handle which is slidable on the arm, the said collar acting to position the handle and also fix the retracted position thereof so as to relieve the worm of excessive forces.

Another feature of the invention is the provision of means for enabling quick and convenient adjustment of the throttle control attachment relative to the speed-control member of the governor at the time of installation of the attachment, and also at any subsequent time. This means comprises a split collar carrying the operating arm of the attachment, the said collar being in turn carried by the shaft on the base and having a draft screw by means of which it may be locked to the shaft in any adjusted position. Thus, the operating arm may be easily adjusted by loosening the split collar on the shaft, and may be correctly positioned with respect to the speed-control member of the governor so that the range of movement of the member is matched to the range of movement of the parts of the attachment.

Other features and advantages will hereinafter appear.

In the accompanying drawings:

Figure 1 is a vertical section through one type of dual remote control station of the system, such as may be used for speed-control purposes.

Fig. 2 is a section taken on the line 2—2 of Fig. 1.

Fig. 3 is an elevational view, partly in section, of a right-hand engine-mounted speed-control portion of the system, connected with the engine governor and cooperable with the remote control station of Figs. 1 and 2 to control the speed of a Diesel engine, the parts being shown in position for proximal control of the engine, and the remote control station being inoperative.

Fig. 4 is an elevational view, looking in the direction of the arrow 4, of the portion of the system shown in Fig. 3.

Fig. 5 is a horizontal section taken on the line 5—5 of Fig. 3.

Fig. 6 is a fragmentary horizontal section through the manual control handle and adjacent parts of Figs. 3 and 5, the handle being shown held in extended position.

Fig. 7 is a view like Fig. 5 but showing the parts shifted for remote control.

Fig. 8 is a view partly in elevation and partly in vertical section of another type of dual remote control station, each half of the station being adapted to provide simultaneous control of two instrumentalities in a prime mover, such as the speed and reverse gear controls in a marine engine.

Fig. 9 is a vertical section taken on the line 9—9 of Fig. 8.

Fig. 11 is a horizontal section similar to Fig. 5, but showing a modification of the invention adapted for use with a left-hand governor installation, and Fig. 12 is a fragmentary elevation of the manually engageable and associated parts of the attachment shown in Fig. 3, but made in accordance with another modification of the invention.

Figure 10:
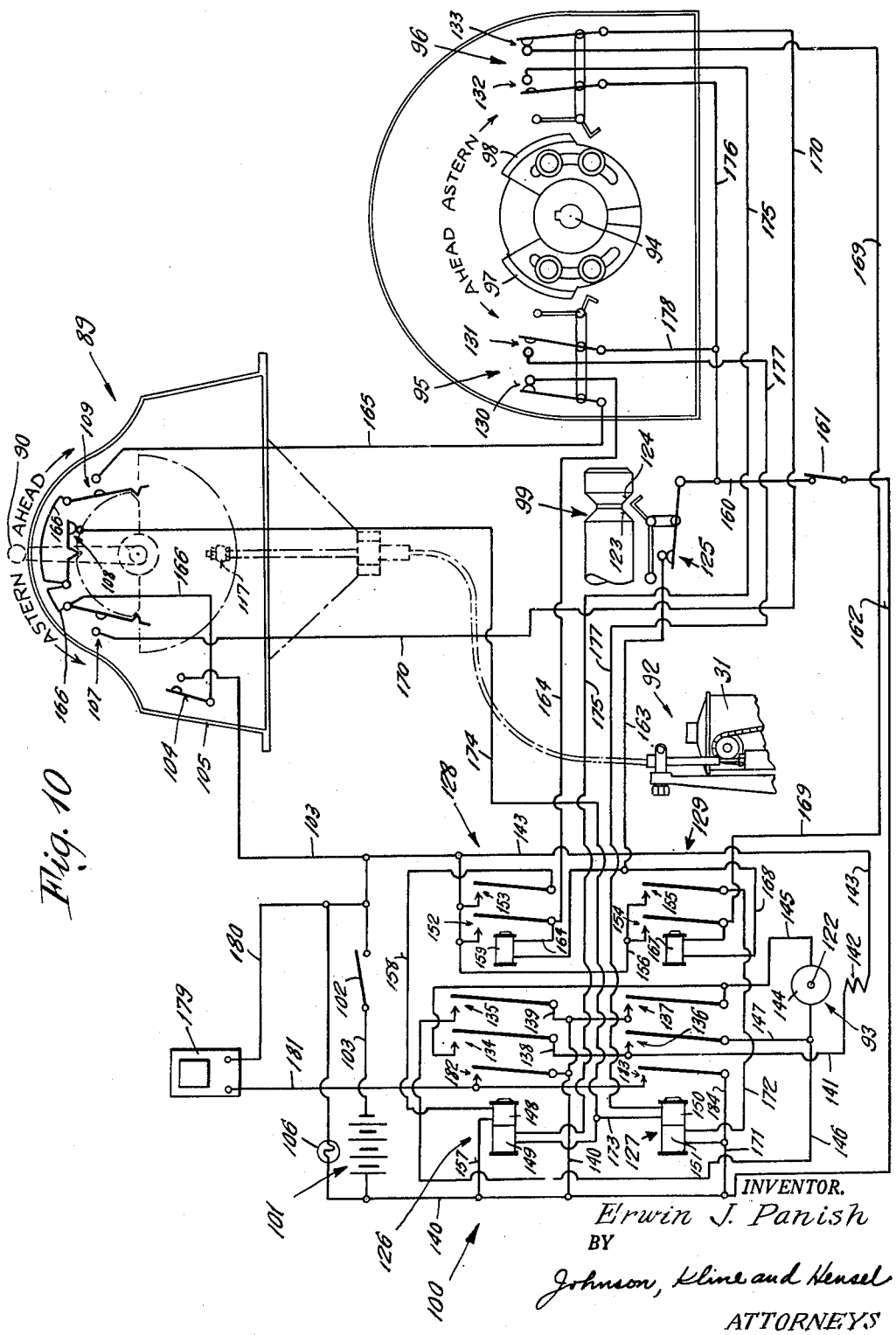
Fig. 10 is a schematic diagram of the control system as applied to a single marine Diesel engine, to control speed and/or reverse gear from either a remote point or from a point adjacent the engine.

Referring to Figs. 3, 4 and 5, the engine-mounted speed-control portion of the control system of the present invention comprises a novel assembly of drive elements connected with a push-pull cable, and connected through a manually operable clutch to the engine governor. This assembly, which is in the form of an attachment, comprises a support or base 10, which may be a metal casting, the base including an apertured mounting plate 11 which is secured by means of cap screws 12 to the frame 13 of the engine. Integral with the mounting plate 11 is a body portion 14 which extends at right angles to the plate, the center of the body portion having a rearwardly extending tubular bearing portion 15 connected with the plate 11 by a web 16.

A shaft 17 is rotatably carried in the bearing portion 15 to extend through the body 14, and the latter is provided with a recess 18 in its face to receive a gear 19 mounted on a hub 20 which is rotatable on and with respect to the shaft 17.

The body 14 has a cover plate 14a extending over the recess 18, the plate being apertured so that the hub 20 may project through it. The inside of the plate 14a engages one side of the gear 19, and the body engages the other side of the gear so as to prevent axial or endwise movement of the latter.

For the purpose of operating the gear 19 from a remote point, the body 14 is provided with a slide 21 in which is carried a rack 22 meshing with the gear 19 and extending generally vertically. The upper end of the rack 22 is connected through a fitting 23 to a link rod 24 slidably carried in a sleeve 25, which latter is fitted into one end of a cable sheath 25a. The sheath 25a is secured by a clamp 26 to the upper end 27 of an upstanding bracket 28 having a channel-shaped, apertured base 29 receiving the cap screws 12, the base being clamped between the mounting plate 11 and frame 13 of the engine. The bracket 28 with its base 29, is shown as being formed of a casting also. The fitting 23 is slidably mounted in and guided by a tubular boss 23a secured to the body 14, and within the sleeve 25 the link rod 24 is connected to one end of a push-pull cable 30 passing through the sheath 25a.

For the purpose of coupling the shaft 17 to the governor 31 of the engine during installation of the attachment without requiring lengthy or difficult fitting operations, a chain and sprocket drive is provided. This drive comprises a sprocket 32 fixed to one end of the shaft 17, a sprocket 32a fixed to the adjustment or speed-control shaft 33, and a chain 34 passing over the sprockets 32 and 32a.

At the exterior of the cover plate 14a the projecting end of the hub 20 carries an arm 35 which is secured by a screw 36, passing through the hub, to the gear 19. Referring to Fig. 3, the arm 35 is also secured to the hub 20 by pins 37.

As shown in Fig. 5, the end of the shaft 17 adjacent the hub 20 carries a fitting 38, the shaft and fitting being apertured to receive a rod 39 having an end 40 of reduced diameter providing a shoulder 40a. The reduced end 40 of the rod 39 is threaded and carries a nut 41 by means of which the fitting 38 and rod are secured to the shaft 17, the shoulder 40a of the rod engaging the said shaft.

The rod 39 slidably carries a handle 42 having an elongate tubular body 43 through which the rod extends. Within the body 43 a helical compression spring 44 is provided, engaging at its ends respectively the end of the body 43 and a plug 45 which latter is carried by the end of the rod 39 and positioned thereon by a pin 46 passing through the rod.

By this construction the handle 42 is yieldably held in a retracted position on the rod 39 as shown in Figs. 3 and 5, yet it may be pulled to an extended position, see Fig. 6, wherein the spring 44 is compressed, the latter, however, continually tending to return the handle to retracted position.

For the purpose of drivingly connecting the rod 39, and therefore the shaft 17, to the gear 19 so that operation of the push-pull cable 30 will drive the shaft, the body 43 of the handle is provided with a lateral extension 47 carrying a tooth 48, and the arm 35 is provided with a slot 49 which can receive the tooth 48 when the handle, if held out and turned to align these, is let go. Thus, when the parts are in the position shown in Fig. 7 the shaft 17 will be connected through the rod 39, body 43, tooth 48 and arm 35 to the gear 19. When in this position, the attachment is set for remote control. It will be seen that movement of the push-pull cable 30 and link rod 24 will cause the rack 22 to move, thereby rotating the gear 19. This in turn will drive the arm 35, and through the body 43 of the handle and the rod 39, will drive the shaft 17. Turning of the shaft 17 and sprocket 32 will drive the chain 34 and the sprocket 32a attached to the governor adjustment shaft 33 so that the loading of the governor will be altered to change the engine speed.

According to the present invention the control attachment is so arranged and constructed that the remote control portion may be quickly and conveniently disconnected at the engine, and the engine speed varied and adjusted from this point. To accomplish this, the body 43 of the handle is provided with a pair of laterally extending arms 50 which are apertured to rotatably carry a shaft 51 having a knurled knob 52 and, between the arms 50, a worm 53.

For engagement with the worm 53 a rack segment 54 is provided, mounted on the stationary cover plate 14a of the base and secured to the latter by rivets 55. Referring to Figs. 3 and 5, the handle 42 when in the retracted position shown, supports the worm 53 so that the latter engages the rack 54; and for this proximal control position the tooth 48 is disengaged from the slot 49 of the arm 35. The gear 19 is thereby disconnected from the rod 39 and does not have driving engagement with the shaft 17. When the handle 42 is so located, the control may be operated rapidly to quickly change the engine speed, by grasping the handle and pulling it to extended position on the rod 39, as shown in Fig. 6. This disengages the worm 53 from the rack segment 54; and the rod 39 and handle 42 are then free to be moved either upward or downward in their arc of travel as desired, thereby rotating the shaft 17 and the sprockets 32, 32a and altering the loading of the governor 31.

When the approximate desired engine speed is obtained, the handle 42 may be released to permit the spring 44 to return it to retracted position and re-engage the worm 53 and the rack 54. A subsequent fine or vernier adjustment may now be had by rotating the worm 53 by means of the knob 52. During this operation of the control, the arm 35, gear 19 and rack 22 are motionless, since no driving connection exists between the arm 35 and rod 39. The worm 53 is not rotated, functions in the manner of a fixed projection or series of projections on the handle, cooperating with the rack segment.

It will be noted that the engagement of the worm 53 and rack segment 54 acts as a lock, to prevent the control from shifting when it is in the position shown in Figs. 3 and 5, since the worm and rack comprise an irreversible drive.

If at any time it should be desired to switch from proximal to remote control, which latter position is shown in Fig. 7, it is merely necessary the grasp the handle 42, pull it outward to extended position, turn the handle 180 degrees, and release it to bring the tooth 48 into the slot 49 of the arm 35. This connects the gear 19 with the shaft 17; and operation of the push-pull cable 30 will not alter the loading of the governor, and the speed of the engine.

For the purpose of minimizing the effect of vibration and shock on the control and to prevent its being jarred from any adjusted setting, the arm 35 is provided with an opposite extension 56 having a counterweight 57. When the parts are in the position shown in Fig. 7 the counterweight 57 will, in compensating for the weight of the arm 39, handle 42 and associated parts, prevent jarring or vibration from inadvertently changing the position of the shaft 17 and thus altering the speed of the engine.

Referring to Figs. 1 and 2, the push-pull cable 30 and sheath 25a may be led to a remote control station 58, the end of the sheath being clamped in a fitting 59 secured to the lower end of a depending frame 60 carried within the bulkhead 61 and secured to the underside of a base 62. The push-pull cable 30 extends into a sleeve 63 where it is secured to the end of a link rod 64 projecting upwardly from the sleeve, the latter having a pivotal mounting in the clamping bracket 59.

The base 62 of the remote control station has a bearing portion 65 rotatably carrying a shaft 66, the outer end of which mounts a manually operable lever 67. The inner end of the shaft 66 has secured to it a circular segment 68 in which is rotatably mounted a pin 69 having an apertured head 70 receiving the upper threaded end of the link rod 64, the latter being secured to the pin by nuts as shown.

By this construction movement of the manually operable lever 67 in one direction or the other raises or lowers the link rod 64 from the position shown, thereby actuating the push-pull cable 30 and rack 22 so as to vary the governor loading and speed of the engine. The upper end of the link rod 64 will follow an arcuate path, and in so doing it will cause the sleeve 63 encircling the rod to pivot slightly at its lower end within the clamping bracket 59.

When the lever 54 is moved approximately 90° clockwise, as viewed in Fig. 2, the link rod 64 will be moved to its lowermost position, driving the rack 22 (Fig. 3) to its lowermost position and rotating the sprockets 32, 32a and adjustment shaft 33 counterclockwise to the limit of the shaft, wherein the governor loading is such as to cause the engine to idle. When the manually operable lever 67 is shifted from the position of Fig. 2 ninety degrees counterclockwise the link rod 64 will be in raised position, raising the rack 22 and rotating the sprockets 32, 32a and adjusting shaft 33 of the governor in a clockwise direction to the other limit of the shaft, corresponding to full speed position of the engine.

Referring to Fig. 2, for the purpose of preventing inadvertent creeping of the control due to vibration of the engine, accidental blows on the manually operable lever 67, etc., a detent and locking means 71 is provided, mounted on the remote control station 58 for engagement with the segment 68 carried by the operating shaft 66. By so locating the detent means 71, the restraining action thereof when the lever 67 is operated to actuate the control does not impose any additional load on the push-pull cable 30, and therefore the only load that the detent might impose on the said cable would be the load occasioned by the effects of engine vibration on the moving parts of the system located adjacent the engine, tending to shift these parts.

The detent 71 comprises a screw 72 threaded into a portion 73 of the remote control housing base, the said screw having a knurled head 74 for engagement by the fingers. The screw 72 is centrally bored and carries a plunger 75 in which is mounted a shoe 76 of leather or the like, for engagement with the cylindrical surface 77 of the segment 68. The plunger 75 carries a screw 78 which extends through the bore of the screw 72 and has a nut 79 located in a counterbore 80 in the screw head 74. A compression coil spring 81 is carried within the bore of the screw 72 for engagement with the latter and with the plunger 75 to yieldably advance the plunger outward of the screw. Thus, the shoe 76 is made to yieldably press against the segment 68 when the screw 72 is turned-in an extent to provide a clearance under the nut 79. By this arrangement a restraint is placed upon movement of the segment 68, and therefore upon the entire movable system of the control, the said restraint being sufficient to prevent creeping of the parts due to engine vibration, etc.

The plunger 75 has a head 82 at the end of the screw 72, providing a shoulder 83 which may be engaged by the end of the screw when the latter is threaded sufficiently far into the portion 73 of the housing. When the plunger 75 is thus backed up by the screw 72, the pressure between the shoe 76 and the segment 68 may be greatly increased, so as to securely lock the segment 68 and therefore lock the movable system of the control device in any adjusted position. It will be noted that this locking may be quickly and conveniently effected merely by threading in the screw 72, and the locking may be quickly released by merely unscrewing the screw slightly to enable the compression spring 81 to take over, in which case the friction of the shoe 76 is lessened so as to enable the handle 67 to be manipulated for actuating the control.

A removable cover 84 is provided for the remote control station 58, the cover being secured to the base 62 by suitable screws (not shown) so that it may be readily removed to provide access to the interior of the station.

Referring to Fig. 2, a stop pin 85 is provided in the remote control station, which by engagement with a rib 86 of the segment 68 defines the extended or full speed position of the lever 67, and by engagement with a second rib 87 of the segment defines the retarded or idling position of the lever.

It will thus be seen that, by the above construction I have provided a remote control system for actuating, through a positive mechanical linkage, the speed-control shaft 33 of the engine governor 31, the said system being actuable by finger-tip pressures and being immediately and conveniently convertible to disconnect the remote station and operate the control from a point adjacent the engine.

If desired, the remote control station 58 may be a dual station, that is, it may have a second lever 88 similar to the lever 67, and have duplicate mechanisms similar to those just described, mounted on the opposite side of the base 62, so that a second engine may be connected and controlled at the station 58. The levers 67 and 88 may be operated simultaneously by grasping both with one hand, or may be operated independently as desired, and either engine may be controlled from either remote or proximal points.

A modification of the invention is shown in Fig. 11, wherein the shaft 17 carried by the base 10 is coupled to the speed-control shaft 33 of the governor through co-engaging pinions 88a and 88b, the latter being rotatably carried on a jack shaft 88c, and being rigid with the sprocket wheel 32, driving the sprocket wheel 32a. By this organization the direction of rotation of the speed-control shaft 33 of the governor is opposite to the direction of rotation of the driving shaft 17 of the attachment and this enables the attachment to control the governor in a left-hand engine installation, since such governor requires rotation of the speed-control shaft which is opposite to the rotation for a right-hand governor.

According to the present invention, means are provided for enabling quick and convenient adjustment of the rack 22 and gear 19 with respect to the speed-control shaft 33 of the engine governor. This means comprises, as illustrated in Fig. 12, a split collar 88d which is carried on the shaft 17 of the attachment, the collar having a draft screw 88e and a tubular radial extension 88f which receives the operating arm 39 and to which the latter is secured by a pin 88g. It will be evident that when the draft screw 88e is loosened, the split collar 88d may be adjustably positioned on the shaft 17, thus enabling the rack 22 and gear 19 to be adjusted with respect to a speed-control shaft 33 of the governor. As a result, the range of movement of the said rack and gear may be coordinated with the range of movement of the governor speed-control shaft.

Also, in accordance with the invention, a simple and novel mechanism is provided for accurately positioning the worm 53 and relieving the latter of unnecessary forces tending to bind it and make its turning difficult when the worm is in operative position engaging the gear segment 54.

Referring to Fig. 12, this means comprises a second split collar 88h which is carried on the tubular radial extension 88f of the collar 88d so as to be axially adjustable and also rotatably adjustable thereon. The collar 88h has a draft screw 88i by means of which it may be locked in any position, and also has a notch 88j adapted to receive the tooth 48 of the handle 42 when the latter is in its retracted position corresponding to the proximal control setting of the device. By the above organization, the split collar 88h may be locked in such an axial position on the extension 88f that engagement between the tooth 48 and the collar will cause the latter to bear all of the force exerted by the compression spring 44 within the handle. This adjusted position of the collar 88h is such that a slight amount of clearance is provided between the worm 53 and gear segment 54, and thus the worm is relieved of force which serves no useful purpose but merely tends to bind the worm and make its operation difficult. Also, the split collar 88h may be located in a rotatable position on the extension 88f such that the worm 53 is properly positioned for correctly meshing with the gear segment 54. This position is closely held, due to the fact that the tooth 48 is wedge-shaped, as is the slot 88j, so that when the tooth is in the slot, no looseness or play occurs, and the handle 42 is therefore precisely located by the collar 88h. By correctly positioning the worm 53 so as to properly mesh with the gear segment 54, there is obviated any tendency for the worm to bind on the teeth of the segment, and this enables the worm to be easily turned by finger pressures on the knob 52.

In Figs. 8 through 10 a combination engine speed and transmission control system is shown, made according to the invention. This system comprises, in the embodiment illustrated, a simplified and reliable mechanism for controlling and correlating the speed-control member and the reverse gear, in the prime mover of a marine craft, the said system being responsive to finger-tip pressures, being adaptable for either remote or proximal control, and enabling practically instantaneous reversing of the propeller of the craft without likelihood of stalling of the engine when utilizing the remote control. The system incorporates the direct-connected speed-control mechanism described above, in combination with power-operated reversing mechanism, the latter having an extremely rapid response characteristic so that changeover from full speed ahead to full speed astern and vice versa is possible in the extremely short interval of approximately 3/5 of a second. The ability to accomplish such "lightning" changeover is of considerable advantage in maneuvering, especially under combat or emergency conditions.

Referring to Fig. 8, the salient parts of the control system comprise a remote control station 89 which may be located on the bridge of the vessel, the said station having a manually operable lever 90 mechanically connected by a push-pull cable 91 with drive mechanism 92 located at the engine and connected with the governor 31, the said mechanism 92 being similar to that just described in connection with the governor 31. The manually operable lever 90 also controls switching means located at the station 89, thereby to actuate an electric motor 93, which latter is coupled to operate the reverse gear shaft 94 of the vessel.

The parts further comprise switch banks 95 and 96 associated with cams 97 and 98 of the reverse gear shaft 94, a torque-responsive switch operator or cam 99 associated with the motor 93, and banks of main and auxiliary relays 100 for controlling the power circuit of the motor. Energy for the system is supplied by a battery 101.

A switch 102, inserted in the main supply wire 103 from the battery, is provided to disconnect the latter when the control system is not in use. The switch 102 may be advantageously located on a panel, near the vessel's engine, on which the banks of relays 100 may also be mounted.

A switch 104 is also provided, located in the housing 105 of the remote control station 89, and connected to the wire 103 to enable an operator to cut off the station at the bridge, and thereby render the station inoperative when so desired.

To provide an indication of the setting of the main switch 102 and therefore an indication of the condition of energization of the system, a signal bulb 106 is connected across the battery 101 and switch 102, the bulb being preferably mounted on the panel carrying the relay banks 100.

Referring to Figs. 8 and 9, the double control station 89 shown herein is similar in many respects to the double control station described in my Patent Number 2,387,343, dated October 23, 1945, and comprises two halves each for controlling a single engine and reverse gear, each operable by a separate manual lever, the functioning of one lever being similar to the functioning of the other. Only one-half the station 89 is depicted in Fig. 9 for use with the control circuits shown therein, which apply to a single engine and reverse gear, it being understood that two or more such circuits may be employed with a corresponding suitable multiple control station.

The manually operable lever 90 of the control station 89 is pivotally mounted in the housing 105 to be movable from a neutral position, shown in Fig. 9, either to the right or left to "ahead" or "astern" positions respectively. A plurality of micro-switches 107, 108 and 109 is mounted on the inside of the housing 105 for operation by a cam segment 110 secured to the lever 90, the segment at its center being notched so that for the neutral position the switch 108 is closed, as shown in Figs. 9 and 10. For this position of the lever 90 the cam segment 110 does not engage the switches 107 and 109, and the latter are arranged to remain open in such circumstance. When the lever 90 is moved either to the left or right sufficiently to cause the cam segment to fully engage one of the switches 107, 109, the engaged switch will be closed, and the switch 108 will be in open position.

To enable these switch-engaging positions, and also the neutral position, to be determined by "feel," and to provide a detent means, a segment 111 is mounted within the housing 105 rigid with the segment 110 and lever 90, and a bell-crank 112 biased by a spring 113 provided, for engagement with notches 114, 115 and 116 in the segment, as shown in Fig. 9.

The lever 90 and segments 110 and 111 may be moved beyond the positions defined by the notches 114 and 116 for the purpose of in each case advancing the throttle of the engine; however the condition of all the switches is not altered from their initially changed condition by this additional movement of the lever, due to the segment 110 continuing to bear on the switch 108 and on either one of the switches 107, 109, according to the direction of movement of the lever 90.

For controlling the throttling of the engine in response to movement of the lever 90 as indicated above, the segment 111 is provided with a fitting 117 to which is secured a link 118 slidable in a sleeve 119 swivel-mounted at 120 in a cable ferrule 121 which is in turn rigidly connected with the housing 105. The link 118 may be coupled by means of the push-pull cable 91 to control the rack 22 and thereby to actuate the speed-control shaft 33 of the governor 31. The mechanism 92 shown in fragmentary elevation in Fig. 10 is similar in all respects to that shown in Figs. 3 through 7, and corresponding parts have been given like characters, it being understood that the mechanism 92 is connected to operate the speed-control shaft 33 of the engine governor 31 so that control of the engine speed is accomplished by finger-tip pressures on the lever 90 at the remote station 89, and that a positive mechanical drive is effected between the lever 90 and the speed-control shaft 33. Thus, when the lever 90 is swung to either side of neutral position (for which position the throttling of the engine is set at idling due to the rack 22 being in fully lowered position), the fitting 117 is moved in an arcuate path, swinging the sleeve 119 and link 118, and sliding the latter outward of the sleeve, raising the rack 22 and increasing the engine speed.

Referring to Fig. 10, the reversible motor 93 has a shaft 122 coupled to drive the vessel's reverse-gear or transmission-operating shaft 94, and the coupling between the shafts 122 and 94 may advantageously be through an overhauling worm drive of the type illustrated and described in my above-referred-to patent.

As a result of the said coupling, energization of the motor 93 will cause the reverse gear shaft 94 to be moved either clockwise to "astern" position, or counterclockwise to "ahead" position.

By means of the said overhauling worm drive referred to, the torque-responsive switch operator 99 which is in the form of a cam having faces 123 and 124, is shifted either to the right or to the left from the position shown in Fig. 10 when the motor 93 has completed movement of the reverse gear shaft 94 to either "ahead" or "astern" positions, the said shifting of the operator causing the associated switch 125 to open.

The switch 125 is so connected, as will be later brought out, that when opened it immediately deenergizes the motor 93, and as a result of such deenergization the operator 99 will be returned to the centralized position shown, allowing the switch 125 to automatically reclose.

In the system shown the energization of the motor 93 may be controlled at will by movement of the combination speed and reverse gear control lever 90, the motor being automatically deenergized by the torque-responsive switch 125 and also by the switch banks 95 and 96 responsive to the positioning of the reverse gear actuating shaft 94. Essentially this system comprises a circuit arrangement including pairs of mechanically coupled, oppositely acting switches 130, 131 and 132, 133, the switch pairs comprising respectively the switch banks 95 and 96 which are under the control of the cams 97 and 98 carried by the reverse gear operating shaft 94. The above parts are so interconnected, and connected with the torque switch 125 and with the switches at the control station 89 as to produce a reliable, attention-free control having desirable characteristics and advantages.

Figure 10 shows the positions of the parts when the control is set for neutral. Considering first the energization for the motor 93, the motor power circuit may be traced as follows: The relay 126 has groups of mechanically coupled contacts 134, 135, the respective groups being connected together by wires 138, 139 as shown.

The wire 139 is connected by a wire 140 to one terminal of the battery 101, and the wire 138 connected by a wire 141 to the motor field 142 which latter is connected by a wire 143 to the supply wire 103 from the battery. The motor armature 144 is connected by a wire 145 to the contact groups 137 and 134, and connected by wires 146 and 147 to the contact groups 135 and 136. This is the conventional reversing circuit for a series motor; when the relay 126 is energized, the contact groups 134, 135 will be closed and the motor driven in one direction, and when the relay 127 is energized, the contact groups 136, 137 will be closed and the motor 93 driven in the opposite direction.

Control of the motor reversing relays 126, 127 is accomplished by the control relays 128 and 129 in the following manner. The relay 126 has two separate energizing windings 148 and 149, either of which when energized may operate the contact groups of the relays, the winding 148 being under the control of the control relay 128, and being energized only when the manual control lever 90 is moved from neutral position to "ahead" position. Similarly the relay 127 has two separate windings 150 and 151, the latter winding being energized only when the control lever 90 is moved from neutral to "astern" position.

The control relays 128 and 129 have pairs of small-current contact groups 152, 153, and 154, 155 respectively, all the groups being connected by a wire 156 to the wire 143 energized from the battery lead 103.

Considering the relay 126, the winding 148 is connected by a wire 157 to the wire 140 from the battery, and by a wire 158 to the contact group 153 of the holding relay 128. Thus when the relay 128 is energized or deenergized, it energizes or deenergizes the winding 148 of the relay 126.

The energization of the winding 159 of the relay 128 is under the control of three switches which are connected to said winding in a series circuit, and such energization may be effected only when all three switches are closed. These switches are the switch 109 at the control station 89, the switch 130 operated by the cam 97 of the reverse gear operating shaft 94, and the torque switch 125 operated by excess driving force from the motor 93. As shown, the torque switch 125, which in practice is closely adjacent the engine, is connected by a wire 160 to a cut-out switch 161 which also may be mounted at the engine, the purpose of which latter switch will be brought out later. From the switch 161 a wire 162 extends to the wire 140 from the battery; and the other terminal of the torque switch 125 is connected by a wire 163 to the relay coil 159, the latter being connected by wires 164 and 165 through the switch 130 to the switch 109 at the control station 89. The switch 109 is in turn connected by a wire 166 to the off-and-on switch 104 for the station.

Control of and connections for the relay 129 are somewhat similar, but arranged for reverse or "astern" operation. The coil 167 of the relay 129 is connected by a wire 168 to the wire 163, and connected by wires 169 and 170 through the switch 133 to the switch 107 at the control station 89, the latter switch being connected with the wire 166. Thus all three switches 125, 133 and 107 must be closed to effect energization of the relay coil 167. The coil 151 of the motor reversing relay 127 is connected by a wire 171 to the return wire 162 and by a wire 172 to the contact group 155 of the holding relay 129, so as to be under the control of the latter.

After either one of the relays 128, 129 has been initially energized, its energization is maintained independently of the switches at the control station 89 and at the switch banks 95 and 96 by holding contact groups 152 and 154 which are connected to bridge said switches. Thus, after initial energization of either of the relays 128 and 129, deenergization may be accomplished only by opening the torque switch 125.

As shown, the contact group 152 is connected by the wires 156 and 164 to effect bridging of the switches 130 and 109, and the contact group 154 connected by the wires 156 and 169 to effect bridging of the switches 133 and 107.

According to the above circuit arrangement, with the switches 102 and 104 closed, if the control lever 90 is moved from its neutral position shown to an "ahead" position wherein the detent notch 116, Fig. 9, is engaged, the switch 108 will be opened and the switch 109 closed. This latter will cause the relay 128 to be energized through the switches 130 and 125, and accordingly will energize the relay 126 and drive the motor 93 forward. The latter will drive the shaft 94 and cams 97 and 98 counterclockwise, opening the switch 130 and closing the switch 131. Opening the switch 130 does not affect the energization of the relay 128 because of the holding contacts 152 of the latter.

The motor 93 will drive the shaft 94 to the limit of the latter's movement, whereupon the increased load on the motor will cause displacement of the cam 99 and opening of the torque switch 125 controlling the circuit of the relay 128. Therefore the relay 126 and the motor 93 will be deenergized.

The torque switch 125 will now reclose, but since the switch 130 remains open, no further energization or operation results.

The reverse gear or transmission of the vessel has now been engaged for forward movement, and the lever 90 may be moved back and forth along its arc of travel to the right of the neutral position, Fig. 9, to control the engine speed by actuating the speed-control shaft 33 of the governor, all without further operating the transmission. In this circumstance it will be noted that the control system itself, omitting the pilot light 106 is electrically deenergized, that is, drawing no current from the battery 101.

Considering again the neutral position of Fig. 9, but with the switches 102 and 104 closed, if the control lever 90 should be moved from the neutral position to an "astern" position wherein the detent notch 114 is engaged, or beyond this position, the switch 109 will be opened and the switch 107 closed. This latter switch will cause energization of the relays 129, 127, and reverse energization of the motor 93, so that the shaft 94 and cams 97 and 98 will be driven in a clockwise direction. The switch 133 will now be opened and the switch 132 closed by the cam 98, and, as the shaft 94 reaches the limit of its movement, engaging the transmission for reverse or "astern," the increased load on the motor will result in displacement of the cam 99 and opening of the torque switch 125. This will deenergize the system in a manner similar to that already explained, and the cam 99 will be returned to the centralized position shown, allowing the switch 125 to reclose. However, the system still remains deenergized, and the control lever 90 may be moved back and forth along its arc of travel to the left of the neutral position (Fig. 9) to control the speed of the engine.

The disengagement of the transmission or reverse gear by return of the shaft 94 to neutral from either the "ahead" or "astern" position to which it has been driven by the motor 93 is accomplished by energization of the relays 126, 127 through the coils 149, 150 thereof. Energization of one or the other of these coils is accomplished through circuits energized by returning the control lever 90 to neutral position, the selection of the correct relay coil being automatically effected by the switches 131 and 132 of the switch banks 95 and 96 under the control of the cams 97 and 98.

The circuits for effecting energization of the coils 149, 150 to return the shaft 94 to neutral are as follows: Both coils have a common connecting wire 173 which is connected by a wire 174 to the switch 108 at the station 89. The coil 149 is also connected by wires 175 and 176 through the switch 132 to the return wire 160, and the coil 150 connected by wires 177 and 178 through the switch 131 to the wire 176 and thence to the return wire 160.

Assuming the control is being operated in the "ahead" position wherein the lever 90 is to the right of neutral (Fig. 9), the switch 108 will be open and the switch 109 closed. For this condition, the shaft 94 and cams 97 and 98 will have been rotated counterclockwise from the positions shown, so that the switch 130 is open and the switch 131 closed. If now the lever 90 is returned to centralized or neutral position, the switch 108 will be closed, and a circuit completed through the same, the relay coil 150 and the switch 131. The relay 127 being energized will connect the motor 93 for operation to return the shaft 94 to neutral position. Immediately before the shaft 94 and cams 97 and 98 reach neutral, the switch 131 will be permitted to again open, thereby deenergizing the relay 127 and therefore the motor 93. The inertia of the latter will carry the shaft 94 and cams beyond the cut-off point, however, to approximately the neutral position again, the circuits of the control being as shown in Fig. 10, wherein they do not draw current from the battery 101.

Similarly, if the control is operating in the "astern" position wherein the lever 90 is to the left of neutral as viewed in Fig. 10, the switch 108 being open, the switch 107 closed, and the switches 132 and 133 respectively closed and open due to the cam 98 and shaft 94 having been rotated clockwise, shifting of the lever 90 to neutral will close the switch 108, energize the relay coil 149 through the switch 132, and cause rotation of the motor 93 to drive the shaft 94 and cam 98 counterclockwise. The switch 132 will then be operated to break the relay circuit so that the shaft 94 and cams 97 and 98 come to rest in the neutral position shown.

The control system as set forth above enables a "lightning" change to be made with "finger-tip" pressures from full speed ahead to full speed astern, or vice versa, in approximately ⅗ of a second. Such a change is made by sweeping the lever 90 from one extreme position through neutral to the opposite extreme position. During such movement the adjusting shaft 33 of the governor 31 is positively operated, being first closed and then again fully opened, and since the time of movement is extremely short, the inertia of the engine does not permit it to decelerate appreciably. The response of the relays to the quick movement of the lever 90 is extremely rapid, as is the response and operation of the motor 93. However, the closing of either of the holding relays 128 and 129 when the shaft 94 and cams 97 and 98 pass through neutral always occurs before the opening of the associated one of the relay energizing switches 130 and 132, due to the power and the small inertia of the relays as compared with the position of the cams 97, 98 and their speed.

As a result, during such quick operation of the control lever 90 it is impossible for the motor 93 to be left deenergized before it has completed the reverse coupling between the engine and the propeller. Thus, a situation could not exist due to such rapid change where the adjustment shaft 33 is fully advanced and the transmission is in neutral position.

Although, during such rapid change from full speed ahead to full speed astern or vice versa, a heavy load is imposed on the engine due to the reversing of the propeller, the engine will not stall because of its inertia plus the fact that the adjusting shaft 33 is advanced when the load is imposed. The response and operation of the control is so rapid that for all practical purposes no lag may be observed in the operation of the transmission.

The detent notches 114, 115 and 116 in the segment 111 of the control station 89 function, when the lever 90 is operated in the normal slow and deliberate manner, to apprise a user, by feel, of the three different positions of the lever corresponding to the ahead, neutral and astern conditions of the reverse gear or transmission.

An important feature of the control system of the present invention is the provision of the single conductor or lead 160, 162 and the cut-out switch 161 in said lead, located at the engine. If for any reason, as when an emergency arises, it is necessary to remove the engine from the control of the system, and operate the reverse gear shaft 94 by hand, the engineer at the engine may do this by merely opening the switch 161 and operating the usual manual control (not shown) for the shaft 94. Where two engines are being operated simultaneously from the bridge of the vessel by two control circuits, it is a simple and convenient matter for an engineer stationed at the engines to disconnect either one of both from the bridge control, and operate the reverse gears manually should this be necessary at any time.

For the purpose of providing a signal to indicate when the transmission is in operation, a buzzer 179 is employed, connected by a wire 180 to the wire 103 and by a wire 181 to contact groups 182 and 183 associated with the relays 126 and 127 respectively, the contact group 182 being connected with the wire 140 and the contact group 183 by a wire 184 to the wire 171.

Whenever either of the relays 126, 127 is energized, the buzzer 179 will sound. The operation of the system is so rapid, however, that the buzz produced by the buzzer is of extremely short duration.

According to the control system as described above operation of the reverse gear and/or speed-control means of a marine engine may be accomplished either from a remote point such as the bridge of the vessel, or from a point adjacent the engine, as desired. As already mentioned, the reverse gear shaft 94 may be operated at the engine and independently of the remote control station 89 by opening the switch 161, and by employing the manual control for the shaft 94. Considering the control of the engine speed, this may be effected by operation of the lever 90 at the remote control station 89 regardless of whether or not the station is connected for operation of the reverse gear. Or, by shifting the handle 42 located in the engine, the lever 90 may be rendered inoperative to turn the governor adjusting shaft 33, and the latter may be operated by manipulation of the handle 42, fine adjustment being obtained by turning the knob 52, all in the manner previously described.

Variations and modifications may be made within the scope of this invention and portions of the improvements may be used without others.

I claim:

1. For use with a prime mover having a clutch and having a variable speed-control member, a combined remote and proximal control device comprising a maually operable instrumentality located at a point remote from the engine and connected to operate the clutch and the speed-control member of the engine; manually operable means located at the engine for selectively rendering the said instrumentality operative or inoperative to control the clutch, the latter being thereby made respectively operable with or operable independently of the instrumentality; and manually operable means located at the engine for selectively rendering the said instrumentality operative or inoperative to control the speed-control member, thereby to enable the latter to be operated respectively from said remote point or at the engine independently of the instrumentality.

2. For use with a prime mover having a clutch and having a variable speed-control member, a combined remote and proximal control device comprising a manually operable instrumentality located at a point remote from the engine and connected to operate and coordinate the clutch and the speed-control member of the engine; and manually operable means located at the engine for selectively rendering the said instrumentality operative or inoperative to control the speed-control member, thereby to enable the latter to be operated respectively from the remote point in coordination with the clutch or at the engine independently of the instrumentality and clutch.

3. For use with a governor-controlled prime mover having a clutch and having a variable speed-control member, a combined remote and proximal control device comprising a manually operable instrumentality located at a point remote from the engine and connected to operate and coordinate the clutch and the speed-control member of the engine; manually operable means located at the engine for selectively rendering the said instrumentality operative or inoperative to control the clutch, the latter being thereby made respectively operable with or operable independently of the instrumentality; and manually operable means located at the engine for selectively rendering the said instrumentality operative or inoperative to control the speed-control member, including means for operating the said member independently of the instrumentality when the latter is rendered inoperative.

4. For use with a prime mover having a clutch and having a variable speed-control member, a combined remote and proximal control device comprising a manually operable instrumentality located at a point remote from the engine; power-driven means controlled by the instrumentality and connected to actuate the said clutch; a positive mechanical drive between the instrumentality and the speed-control member of the engine; manually operable means located at the engine for selectively rendering the said power-driven means responsive or unresponsive to the said instrumentality, the clutch being thereby made respectively operable with or operable independently of the instrumentality; and manually operable means located at the engine for selectively connecting or disconnecting the said mechanical drive so that the instrumentality is respectively operative or inoperative to control the speed-control member, the latter being freed for operation at the engine independently of the instrumentality when the mechanical drive is disconnected.

5. For use with a governor-controlled prime mover having a clutch and having a variable speed-control member, a combined remote and proximal control device comprising a manually operable instrumentality located at a point remote from the engine; an electric control having switches operable by the instrumentality, said control being connected to actuate the said clutch, and having a rapid response characteristic; a positive mechanical drive between the instrumentality and the speed-control member of the engine, the said instrumentality coordinating the operation of the clutch and the speed-control member; manually operable switch means incorporated in said electric control and located at the engine for selectively rendering the said electric control responsive or unresponsive to the instrumentality, the clutch being thereby made respectively operable with or operable independently of the instrumentality; and manually operable releasable drive means located at the engine for selectively connecting or disconnecting the said mechanical drive so that the instrumentality is respectively operative or inoperative to control the speed-control member, the latter being freed for operation at the engine independently of the instrumentality when the mechanical drive is disconnected.

6. For use with a prime mover having a variable speed-control member, a combined remote and proximal control device comprising a manually operable instrumentality located at a point remote from the engine and connected to operate the speed-control member of the engine; and manually operable means located at the engine for rendering the said instrumentality inoperative to control the speed-control member, said means having a vernier mechanism for actuating the said member and obtaining fine adjustment thereof independently of the instrumentality.

7. For use with a prime mover having a variable speed-control member, a combined remote and proximal control device comprising a manually operable instrumentality located at a point remote from the engine and connected to operate the speed-control member of the engine; and manually operable means located at the engine for rendering the said instrumentality inoperative to control the speed-control member, including an irreversible drive means for actuating the said member and automatically maintaining the latter in adjusted position.

8. In a prime mover having a variable speed-control shaft, a combined remote and proximal control device comprising a base attached to the engine frame; a shaft rotatable on the base; a chain and sprocket drive connecting the two shafts together; a manually operable instrumentality located at a point remote from the engine, mechanically connected to the shaft on the base; and means carried by the base for disconnecting the instrumentality from the shaft of the base, including means for actuating the said shaft.

9. For use with a prime mover having a variable speed-control member, a combined remote and proximal control device comprising a manually operable instrumentality located at a point remote from the engine and connected to operate the speed-control member of the engine; and manually operable means located at the engine for rendering the said instrumentality inoperative to control the speed-control member, including irreversible drive means for actuating the said member, said drive means providing for fine adjustment of the member.

10. For use with a prime mover having a variable speed-control member, a combined remote and proximal control device comprising a manually operable instrumentality located at a point remote from the engine and mechanically connected to operate the speed-control member of the engine; and a clutch located at the engine for rendering the said instrumentality inoperative to control the speed-control member, said clutch including a manually operable part for actuating the said member.

11. In a prime mover having a variable speed-control shaft, a combined remote and proximal control device comprising a base attached to the engine frame; a shaft rotatable on the base; a chain and sprocket drive connecting the two shafts together; a manually operable instrumentality located at a point remote from the engine, mechanically connected to the shaft on the base; and a two-part clutch carried by the base for disconnecting the instrumentality from the shaft, said clutch having a handle on one of its parts for actuating the said shaft.

12. For use with a prime mover having a variable speed-control member, a combined remote and proximal control device comprising a manually operable instrumentality located at a point remote from the engine and mechanically connected to operate the speed-control member of the engine; a two-part clutch located at the engine for rendering the said instrumentality inoperative to control the speed-control member, the parts of the clutch drivingly engaging each other at but a single relative position; and means connected with one of the clutch parts for actuating the said member.

13. For use with a prime mover having a variable speed-control member, a combined remote and proximal control device comprising a manually operable instrumentality located at a point remote from the engine and mechanically connected to operate the speed-control member of the engine; and a clutch located at the engine for rendering the said instrumentality inoperative to control the speed-control member, said clutch comprising a manually operable pivotally mounted arm drivingly connected with the speed-control member, and comprising a part cooperable to drive the arm, said part and arm having releasable means mechanically connecting them together.

14. For use with a prime mover having a variable speed-control member, a combined remote and proximal control device comprising a manually operable instrumentality located at a point remote from the engine and mechanically connected to operate the speed-control member of the engine; a clutch located at the engine for rendering the said instrumentality inoperative to control the speed-control member, said clutch comprising a manually operable pivotally mounted arm drivingly connected with the speed-control member, and comprising a part cooperable to drive the arm, said part and arm having releasable means mechanically connecting them together; and a counterweight to balance the weight of the arm and prevent creepage of the control device due to vibration or shocks.

15. For use with a prime mover having a variable speed-control member, a combined remote and proximal control device comprising a manually operable instrumentality located at a point remote from the engine and mechanically connected to operate the speed-control member of the engine; and a clutch located at the engine for rendering the said instrumentality inoperative to control the speed-control member, said clutch comprising a manually operable pivotally mounted arm drivingly connected with the speed-control member, and comprising a part cooperable to drive the arm, said part and arm having releasable means including a handle mechanically connecting them together, the said handle being carried by the arm and constituting an operating means therefor to actuate the speed-control member when the clutch is disengaged.

16. A combination remote and proximal control device for actuating the adjustment member of the governor in a Diesel engine, comprising a base secured to the engine frame; a shaft rotatable on the base; drive means between the shaft and the adjustment member of the governor; a clutch part rotatable with respect to the shaft; a push-pull cable extending adjacent the clutch part; drive means between the clutch part and push-pull cable, movement of the latter rotating the said part; and manually operable means for turning the shaft to actuate the adjustment member of the governor, said means having a second clutch part cooperable with the first clutch part, and being operable to bring said clutch parts into engagement and connect the cable to drive the adjustment member of the governor, and the said clutch parts when disengaged enabling the shaft and adjustment member of the governor to be actuated independently of the push-pull cable.

17. A combination remote and proximal control device for actuating the adjusting member of the governor in a Diesel engine, comprising a base secured to the engine frame; a shaft rotatable on the base; drive means between the shaft and the adjustment member of the governor; a spur gear rotatable on the shaft; a rack meshing with the spur gear, slidably carried on the base; a push-pull cable extending from a remote point and connected with the rack to operate the same; an arm fixed to the shaft for operating the latter and the adjustment member of the governor; a handle on the arm; a manually operable worm rotatably mounted on the handle; a gear segment on the base for engagement with the worm so that turning of the latter causes regulative movement of the arm, said handle being movable on the arm to disengage the worm from the gear segment; and means for drivingly connecting the spur gear and shaft with each other when the handle is moved to disengage the worm, so that movement of the push-pull cable operates the adjustment member of the governor.

18. A combination remote and proximal control device for actuating the adjustment member of the governor in a Diesel engine, comprising a base secured to the engine frame; a shaft rotatable on the base; drive means between the shaft and adjustment member of the governor; a spur gear on the shaft; a rack meshing with the spur gear, slidably carried by the base; a push-pull cable extending from a remote point and connected with the rack to operate the same; an arm fixed to the shaft for operating the latter and adjustment member of the governor; a manually operable vernier drive mechanism connected between the base and the arm to regulatively move the latter; and means for rendering inoperative the vernier drive mechanism, and for drivingly connecting the shaft with the spur gear so that movement of the push-pull cable rotates the shaft and operates the adjustment member of the governor.

19. A combination remote and proximal control device for actuating the adjustment member of the governor in a Diesel engine, comprising a base secured to the engine frame; a shaft rotatable on the base; means drivingly connecting the said shaft and the adjustment member of the governor; a spur gear rotatable on the shaft; a rack meshing with the spur gear, slidably carried by the base; a push-pull cable extending from a remote point and connected with the rack to operate the same; an arm fixed to the shaft for operating the latter and the adjustment member of the governor; a handle slidably mounted on the arm and movable between extended and retracted positions, said handle being rotatable on the arm; yieldable means for holding the handle in, and for returning it to retracted position on the arm; a rack segment on the base, engaging the projection of the handle when the latter is in retracted position, the projection being disengageable from the rack by moving the handle to extended position against the said yielding means; and means drivingly connecting the spur gear and shaft with each other through the arm and handle when the latter, after being extended to disengage the projection, is turned through part of a revolution and released, thereby to connect the push-pull cable for operating the adjustment member of the governor.

20. A combination remote and proximal control device for actuating the adjustment member of the governor in a Diesel engine, comprising a base secured to the engine frame; a shaft rotatable on the base; means drivingly connecting the said shaft and the adjustment member of the governor; a spur gear rotatable on the shaft; a rack meshing with the spur gear, slidably carried by the base; a push-pull cable extending from a remote point and connected with the rack to operate the same; an arm fixed to the shaft for operating the latter and the adjustment member of the governor; a handle slidably mounted on the arm and movable between extended and retracted positions, said handle being rotatable on the arm; yieldable means for holding the handle in, and for returning it to retracted position on the arm; a worm rotatably mounted on the handle, and operable manually; a rack segment on the base for engagement with the worm when the handle is in retracted position, turning of the worm moving the arm and handle, and the worm being disengageable from the rack by pulling the handle to an extended position against the said yieldable means; a clutch member rigid with the spur gear; and a pin and slot connection between the clutch member and handle, said connection being operative when the handle, after being extended to disengage the worm, is turned through part of a revolution and released, thereby to connect the push-pull cable for operating the adjustment member of the governor.

21. For use with a prime mover having a variable speed-control member, a combined remote and proximal control device comprising a manually operable instrumentality located at a point remote from the engine and connected to operate the speed-control member of the engine; and manually operable means located at the engine for rendering the said instrumentality inoperative to control the speed-control member, said means including a vernier mechanism for actuating the said member and obtaining fine adjustment thereof independently of the instrumentality, and the said mechanism being disengageable to enable coarse adjustment of the member to be accomplished by the said means.

22. For use with a prime mover having a variable speed-control member, a combined remote and proximal control device comprising a manually operable instrumentality located at a point remote from the engine; a reversible, positive mechanical drive between the said instrumentality and the speed-control member of the engine; and manually operable means located at the engine for disconnecting the said drive and rendering the instrumentality incapable of controlling the speed-control member, the said means including a device for actuating the said member.

23. For use with a prime mover having a variable speed-control member, a combined remote and proximal control device comprising a manually operable instrumentality located at a point remote from the engine; a reversible, positive mechanical drive between said instrumentality and the speed-control member of the engine; means associated with the said drive for enabling adjustable positioning of the instrumentality with respect to the said speed-control member; and a manually operable mechanism located at the engine for rendering the said instrumentality incapable of controlling the speed-control member, including a device for actuating the said member.

24. In a prime mover having a variable speed-control shaft, a combined remote and proximal control device comprising a base attached to the engine frame; a shaft rotatable on the base; drive means connecting the two said shafts together; a manually operable instrumentality located at a point remote from the engine, mechanically connected to drive the shaft on the base; means, including a split collar carried by the shaft on the base, for enabling adjustable positioning of the said instrumentality with respect to the variable speed-control shaft; and mechanism carried by the base for disconnecting the instrumentality from the shaft of the base, including a device for actuating the said shaft.

25. A combination remote and proximal control device for actuating the adjusting member of the governor in a Diesel engine, comprising a base secured to the engine frame; a shaft rotatable on the base; drive means between the shaft and the adjustment member of the governor; a spur gear rotatable on the shaft; a rack meshing with the spur gear, slidably carried on the base; a push-pull cable extending from a remote point and connected with the rack to operate the same; an arm fixed to the shaft for operating the latter and the adjustment member of the governor; a handle on the arm; a manually operable worm rotatably mounted on the handle; a gear segment on the base for engagement with the worm so that turning of the latter causes regulative movement of the arm, said handle being rotatable and axially movable on the arm to disengage the worm from the gear segment; means for positioning the handle on the arm against turning when the worm and gear segment are in engagement with each other; and means for drivingly connecting the spur gear and shaft with each other when the handle is moved to disengage the worm from the gear segment, so that movement of the push-pull cable operates the adjustment member of the governor.

26. A combination remote and proximal control device for actuating the adjusting member of the governor in a Diesel engine comprising a base secured to the engine frame; a shaft rotatable on the base; drive means between the shaft and the adjustment member of the governor; a spur gear rotatable on the shaft; a rack meshing with the spur gear, slidably carried on the base; a push-pull cable extending from a remote point and connected with the rack to operate the same; an arm fixed to the shaft for operating the latter and the adjustment member of the governor; a handle on the arm; a manually operable worm rotatably mounted on the handle; a gear segment on the base for engagement with the worm so that turning of the latter causes regulative movement of the arm, said handle being movable on the arm to disengage the worm from the segment; means for locating the handle on the arm when the worm and gear segment are in engagement, to provide operating clearance between the said segment and worm; and means for drivingly connecting the spur gear and shaft with each other when the handle is moved to disengage the worm from the gear segment, so that movement of the push-pull cable operates the adjustment member of the governor.

27. For use with a prime mover having a variable speed-control member, a combined remote and proximal control device comprising a manually operable instrumentality located at a point remote from the engine and connected to operate the speed-control member of the engine; a manually operable device located at the engine for rendering the said instrumentality inoperative to control the speed-control member; means associated with the manually operable device and including a worm and gear segment for actuating the said member to obtain fine adjustment thereof; and mechanism for enabling adjustable positioning of the said instrumentality with respect to the said speed-control member.

28. For use with a prime mover having a variable speed-control member, a combined remote and proximal control device comprising a base located at the engine; a manually operable instrumentality located at a point remote from the engine and connected to operate the speed-control member of the engine; manually operable means carried by the base for rendering the said instrumentality inoperative to control the speed-control member; mechanism including an operating arm carried by the base, including a handle slidably mounted on the arm and movable axially thereof, and including a worm carried by the arm and a gear segment on the base and engageable by the worm, for actuating the said member independently of the instrumentality to obtain fine adjustment thereof; and means for positioning the handle on the arm to align the worm for meshing engagement with the gear segment, and to maintain normal clearance between the said worm and segment.

ERWIN J. PANISH.

REFERENCES CITED

The following references are of record in the file of this patent:

UNITED STATES PATENTS

| Number | Name | Date |
|---|---|---|
| 1,985,207 | Jensen | Dec. 18, 1934 |
| 1,987,066 | Kingston | Jan. 8, 1935 |
| 2,127,225 | Jensen | Aug. 16, 1938 |
| 2,161,732 | Manteuffel | June 6, 1939 |
| 2,237,719 | Tiebel | Apr. 8, 1941 |
| 2,358,094 | Panish | Sept. 12, 1944 |
| 2,396,231 | Brill | Mar. 12, 1946 |
| 2,422,596 | Stevens | June 17, 1947 |